United States Patent
Filby et al.

(10) Patent No.: US 9,321,967 B2
(45) Date of Patent: Apr. 26, 2016

(54) OIL SANDS EXTRACTION

(75) Inventors: John Filby, Calgary (CA); Shai Aviezer, Merkaz (IL); Eli Tannenbaum, Hod-Hasharon (IL); Eva Tannenbaum, legal representative, Hod-Hasharon (IL)

(73) Assignee: BRACK CAPITAL ENERGY TECHNOLOGIES LIMITED (CY)

( * ) Notice: Subject to any disclaimer, the term of this patent is extended or adjusted under 35 U.S.C. 154(b) by 0 days.

(21) Appl. No.: 13/390,712

(22) PCT Filed: Aug. 17, 2010

(86) PCT No.: PCT/IB2010/002040
§ 371 (c)(1),
(2), (4) Date: Aug. 6, 2012

(87) PCT Pub. No.: WO2011/021092
PCT Pub. Date: Feb. 24, 2011

(65) Prior Publication Data
US 2013/0020235 A1 Jan. 24, 2013

Related U.S. Application Data

(60) Provisional application No. 61/272,100, filed on Aug. 17, 2009, provisional application No. 61/310,526, filed on Mar. 4, 2010, provisional application No. 61/312,867, filed on Mar. 11, 2010.

(51) Int. Cl.
*C10G 1/04* (2006.01)
*C10G 31/06* (2006.01)
*C10G 31/10* (2006.01)
(Continued)

(52) U.S. Cl.
CPC ...... *C10G 1/04* (2013.01); *C10G 1/045* (2013.01); *C10G 21/003* (2013.01); *C10G 31/06* (2013.01); *C10G 31/10* (2013.01); *B01D 21/262* (2013.01); *C10G 2300/44* (2013.01)

(58) Field of Classification Search
CPC ........ C10G 1/04; C10G 1/045; C10G 21/003; C10G 21/12; C10G 21/14; C10G 31/10; C10G 2300/44
USPC ......... 208/390, 424, 425, 426, 428, 429, 434, 208/435
See application file for complete search history.

(56) References Cited

U.S. PATENT DOCUMENTS 3,475,318 A 10/1969 Gable
3,798,157 A 3/1974 Manzanilla et al.
(Continued)

FOREIGN PATENT DOCUMENTS

CA 1068228 A 12/1979
CA 1085761 9/1980
(Continued)

OTHER PUBLICATIONS

T.Babadagli., "Bitumen extraction from oil sands ore-water slurry using CaO (Lime) and/or ozone", Publication Date: Oct. 23, 2008.
Jun Long, "Effect of operating temperature on water-based oil sands processing", Canadian Journal of Chemical Engineering, Publication Date: Oct. 2007, vol. 85, pp. 726-738.
(Continued)

*Primary Examiner* — Prem C Singh
*Assistant Examiner* — Brandi M Doyle
(74) *Attorney, Agent, or Firm* — Cantor Colburn LLP

(57) ABSTRACT

A process for the separation of high purity organic fractions from oil sands is disclosed.

20 Claims, 5 Drawing Sheets

(51) Int. Cl.
C10G 21/00 (2006.01)
B01D 21/26 (2006.01)

(56) References Cited

U.S. PATENT DOCUMENTS

| | | | |
|---|---|---|---|
| 3,838,738 A | 10/1974 | Redford et al. |
| 3,856,474 A | 12/1974 | Pittman et al. |
| 3,925,189 A | 12/1975 | Wicks, III |
| 3,929,193 A | 12/1975 | Duke |
| 3,941,679 A | 3/1976 | Smith et al. |
| 3,941,820 A | 3/1976 | Jackson et al. |
| 3,990,885 A | 11/1976 | Baillie et al. |
| 4,007,785 A | 2/1977 | Allen et al. |
| 4,022,277 A | 5/1977 | Routson |
| 4,029,568 A | 6/1977 | Pittman et al. |
| 4,033,729 A | 7/1977 | Capes |
| 4,035,282 A | 7/1977 | Stuchberry et al. |
| 4,036,732 A | 7/1977 | Irani |
| 4,054,505 A | 10/1977 | Hart, Jr. et al. |
| 4,057,486 A | 11/1977 | Meadus et al. |
| 4,067,796 A | 1/1978 | Alford et al. |
| 4,098,648 A | 7/1978 | Kraemer et al. |
| 4,101,172 A | 7/1978 | Rabbitts |
| 4,101,413 A | 7/1978 | Jones et al. |
| 4,108,760 A | 8/1978 | Williams et al. |
| 4,110,195 A | 8/1978 | Hardin |
| 4,120,775 A | 10/1978 | Murray |
| 4,121,995 A | 10/1978 | Hsu |
| 4,139,450 A | 2/1979 | Hanson et al. |
| 4,160,718 A | 7/1979 | Rendall |
| 4,167,470 A | 9/1979 | Karnofsky |
| 4,217,202 A | 8/1980 | Paraskos et al. |
| 4,229,281 A | 10/1980 | Alquist et al. |
| 4,239,617 A | 12/1980 | Karnofsky |
| 4,242,195 A | 12/1980 | Rudnick |
| 4,290,880 A | 9/1981 | Leonard |
| 4,311,561 A | 1/1982 | Hastings |
| 4,341,619 A | 7/1982 | Poska |
| 4,347,118 A | 8/1982 | Funk et al. |
| 4,364,740 A | 12/1982 | Massey et al. |
| 4,372,383 A | 2/1983 | Ames |
| 4,385,982 A | 5/1983 | Anderson |
| 4,389,300 A | 6/1983 | Mitchell |
| 4,390,411 A | 6/1983 | Scinta et al. |
| 4,397,736 A | 8/1983 | Low |
| 4,424,112 A | 1/1984 | Rendall |
| 4,448,667 A | 5/1984 | Karnofsky |
| 4,450,913 A | 5/1984 | Allen et al. |
| 4,454,023 A | 6/1984 | Lutz |
| 4,455,216 A | 6/1984 | Angevine et al. |
| 4,464,246 A | 8/1984 | Sanda |
| 4,464,256 A | 8/1984 | Plourde |
| 4,481,099 A | 11/1984 | Mitchell |
| 4,495,057 A | 1/1985 | Amirijafari et al. |
| 4,515,685 A | 5/1985 | Yeh |
| 4,518,480 A | 5/1985 | Audeh et al. |
| 4,532,024 A | 7/1985 | Haschke et al. |
| 4,536,283 A | 8/1985 | Davis |
| 4,539,093 A | 9/1985 | Friedman et al. |
| 4,539,097 A | 9/1985 | Kelterborn et al. |
| 4,572,777 A | 2/1986 | Peck |
| 4,596,651 A | 6/1986 | Wolff et al. |
| 4,673,484 A | 6/1987 | Babcock et al. |
| 4,676,889 A | 6/1987 | Hsieh et al. |
| 4,699,709 A | 10/1987 | Peck |
| 4,719,008 A | 1/1988 | Sparks |
| 4,726,810 A | 2/1988 | Ignasiak |
| 4,765,885 A | 8/1988 | Sadeghi et al. |
| 4,772,379 A | 9/1988 | Gomberg |
| 4,822,481 A | 4/1989 | Taylor |
| 4,875,998 A | 10/1989 | Rendall |
| 4,888,108 A | 12/1989 | Farnand |
| 4,906,355 A | 3/1990 | Lechnick et al. |
| 4,963,250 A | 10/1990 | So |
| 5,032,146 A | 7/1991 | Knudson et al. |
| 5,124,008 A | 6/1992 | Rendall |
| 5,143,598 A | 9/1992 | Graham |
| 5,252,138 A | 10/1993 | Guymon |
| 5,316,659 A | 5/1994 | Brons et al. |
| 5,326,456 A | 7/1994 | Brons et al. |
| 5,882,428 A | 3/1999 | Gawne |
| 6,207,044 B1 | 3/2001 | Brimhall |
| 6,214,213 B1 | 4/2001 | Tipman et al. |
| 7,029,570 B2 | 4/2006 | Mason et al. |
| 7,128,375 B2 | 10/2006 | Watson |
| 7,585,407 B2 | 9/2009 | Duyvesteyn et al. |
| 2003/0213747 A1 | 11/2003 | Carbonell et al. |
| 2005/0211434 A1 | 9/2005 | Gates et al. |
| 2006/0027488 A1 | 2/2006 | Gauthier |
| 2006/0113218 A1 | 6/2006 | Hart et al. |
| 2006/0196812 A1 | 9/2006 | Beetge et al. |
| 2008/0085851 A1 | 4/2008 | Yeggy et al. |
| 2008/0210602 A1* | 9/2008 | Duyvesteyn ............... 208/390 |
| 2009/0078415 A1 | 3/2009 | Fan et al. |
| 2009/0145809 A1 | 6/2009 | Ledbetter, Jr. et al. |
| 2009/0200209 A1 | 8/2009 | Sury et al. |
| 2009/0321322 A1 | 12/2009 | Sharma et al. |
| 2009/0321323 A1 | 12/2009 | Sharma et al. |
| 2009/0321324 A1 | 12/2009 | Sharma et al. |
| 2010/0051511 A1 | 3/2010 | Faerman |
| 2010/0096297 A1 | 4/2010 | Stevens et al. |
| 2010/0101980 A1 | 4/2010 | Stauffer |
| 2010/0101981 A1 | 4/2010 | Moffett et al. |

FOREIGN PATENT DOCUMENTS

| | | |
|---|---|---|
| CA | 1105866 | 7/1981 |
| CA | 1169002 | 6/1984 |
| CA | 1190877 | 7/1985 |
| CA | 1200778 | 2/1986 |
| CA | 1272975 | 8/1990 |
| CA | 2009144 | 8/1991 |
| CA | 2217300 | 3/1999 |
| CA | 2281276 A1 | 2/2001 |
| CA | 2332207 A1 | 10/2001 |
| CA | 2435113 C | 6/2008 |
| CA | 2584712 A1 | 10/2008 |
| CA | 2638148 A1 | 3/2010 |
| CN | 101289625 A | 10/2008 |
| DE | 2260777 A | 12/1972 |
| DE | 4208180 A | 9/1993 |
| DE | 4208182 A | 9/1993 |
| DE | 10337610 A | 3/2005 |
| EP | 0081016 A1 | 6/1983 |
| EP | 1757672 B | 2/2012 |
| GB | 645055 | 10/1950 |
| GB | 763751 | 11/1954 |
| GB | 990953 | 12/1963 |
| GB | 2001670 A | 2/1979 |
| GB | 2051856 A | 1/1981 |
| GB | 2084179 A | 4/1982 |
| KR | 20100025076 A | 8/2008 |
| WO | 0022067 A1 | 4/2000 |
| WO | 2007146992 A2 | 12/2007 |
| WO | 2008144934 A1 | 12/2008 |
| WO | 2009059124 A2 | 5/2009 |

OTHER PUBLICATIONS

N. Wang, "Small scale simulation of pipeline or stirred tank conditioning of oil sands: temperature and mechanical energy", Journal of Canadian Petroleum Technology, Publication Date: Jan. 2002, vol. 41, No. 1, pp. 8-10.

J. Long "On the Role of Temperature in Oil Sands Processing", University of Alberta, Publication Date: May 19, 2005 Energy & Fuels 2005, 19, 1440-1446.

International Search Report PCT/IB2010/02040; Dated Feb. 28, 2011.

Franand et al., "Removal of Intractable Fine Solids from Bitumen Solutions Obtained by Solvent Extraction of Oil Sands", Fuel Processing Technology, 10, 1985, pp. 131-144.

Mitchell et al., The solubility of asphaltenes in hydrocarbon solvents, Fuel, 1973, vol. 52, pp. 149-152.

* cited by examiner

OIL SANDS EXTRACTION

FIELD OF THE INVENTION

This invention generally relates to a process for the extraction of oil sands.

BACKGROUND OF THE INVENTION

Oil Sands occur widely and are loosely defined as being naturally occurring oil deposits, which generally comprise a mineral matrix impregnated with extra-heavy oil—bitumen, tar or asphalt—and, depending upon their location, vary widely in mineral and oil composition. While oil sands are found in many regions of the world, the largest deposits occur in Western Canada and in Venezuela. In the United States, oil sands are primarily concentrated in Eastern Utah.

Where oil sand deposits occur close to the surface, recovery is achieved by mining the deposit and extracting the oil in a water-washing process. In deposits too deep to mine, steam is pumped into the deposit to wash the oil from the sand in-situ and recovered oil is pumped to the surface. In either case, recovered oil must be upgraded before it can be processed in a conventional refinery. Some Canadian productions are processed in Upgrading Plants, yielding high quality synthetic crude which is sold to refineries in the United States and Canada; the remaining production is shipped as a diluted bitumen stream to specially designed refineries, mainly in the United States.

The mineral matrix in the Canadian oil sands is mainly loosely consolidated, water-wet sand. Oil is readily released from the matrix by forming slurry with hot water and then allowing separated oil to float to the surface as "froth" in a cone shaped separation vessel. This process, typically referred to as a warm-water extraction process, provides recovered oil (bitumen froth) containing approximately 10% mineral matter and up to 30% water. Further processing is typically required to produce clean oil. In this process a solvent is added and the mineral matter and water are removed by a combination of settling or mechanical devices, such as high-speed centrifuges.

The two-step process has overall recovery efficiency greater than 90% and is practiced on a colossal scale. A typical processing plant will produce about 150,000 barrels per day. The main advantage of warm-water processing is its simplicity. Disadvantages include the high water usage and need for huge containment ponds to store the dispersed clays.

Since the mid 1930's, when oil sands extraction experimentation began, a number of alternative extraction processes were developed in Canada and the United States. Most are variations on the warm-water process.

In a typical solvent extraction method, following the crushing and removal of oversize material (rocks), oil sands are contacted with a solvent, usually in a rotating drum. In this process the oil is dissolved by the solvent which frees it from the mineral matrix. The oil/solvent mixture is then drained from the mineral and the mineral is again washed with a new portion of the solvent. The mineral, now free of oil but saturated with solvent, is stripped to recover the solvent for recycling.

U.S. Pat. No. 4,719,008 to Sparks et al and U.S. Pat. No. 4,057,486 to Meadows et al, each herein incorporated by reference, disclose a solvent extraction process of oil from oil sands involving a continuous combined extraction-agglomeration step employing an organic solvent. While the main advantage of the solvent route is the ability to process all grades of oil sand with high (95%) recovery efficiency, the high energy required for recovery of solvent from the washed mineral and the need for sealed equipment to contain solvent losses make the solvent extraction processes costly and complex.

U.S. Pat. Nos. 4,167,470 and 4,239,617 to Karnofsky et al, disclose a solvent extraction process of oil from oil bearing diatomite ore, wherein the ore is extracted by countercurrent decantation with a hydrocarbon solvent which is later recovered from the extractor by repeated evaporations and stripping. Water is employed to displace a major portion of the solvent therefrom, which may then be recovered.

U.S. Pat. No. 4,160,718 to Rendall discloses a continuous solvent extraction process of oil from oil sands employing a closed rotary contactor.

Unlike the solvent extraction methods, in the thermal extraction methods following the crushing and removal of oversize, the oil sands are rapidly heated to a high temperature (typically over 500° C.) in a containment vessel. The high temperature cracks the heavy oil forming lighter oil, gas and coke, with the lighter oil and gas being removed as vapors and the coke remaining as a coating on the mineral sand. Next, the coke-coated sand is burned in a separate vessel and the hot sand is returned to the coking vessel to mix with incoming oil sand and provide heat for the coking process. As with other methods, the sand is quenched with water and discarded, and the light oil is condensed to form a partially upgraded product.

The main advantage of the thermal processing is that it combines oil extraction with partial upgrading. Instead of extra-heavy oil, the product is higher API (American Petroleum Institute measure of relative density) oil which would be more commercially valuable. As with the solvent extraction methods, however, the main disadvantages of thermal processing are their complexity and high cost.

REFERENCES

[1] U.S. Pat. No. 4,719,008
[2] U.S. Pat. No. 4,167,470
[3] U.S. Pat. No. 4,239,617
[4] U.S. Pat. No. 4,160,718
[5] Canadian Patent no. 1,068,228
[6] U.S. Pat. No. 7,128,375
[7] U.S. Pat. No. 5,124,008
[8] U.S. Pat. No. 4,057,486

SUMMARY OF THE INVENTION

A major complicating factor in all extraction processes is the presence of clays and fine mineral particles in oil sands. The ultra-fine particles hinder the key separation stage of oil from the mineral matrix. While certain technologies have been developed to at least partially provide a solution to this problem, an overall approach for efficient and cost effective extraction of organic material from oil sands has yet to be developed.

Thus, the process of the present invention is based on the realization that currently available processes for the recovery of bitumen, particularly those involving solvent extractions, are not sufficiently efficient in recovering high quality bitumen, free of fine inorganic particles from oil-sands. The present invention overcomes many of the disadvantages associated with processes of the art and provides an efficient and relatively economical process yielding upgraded bitumen, containing reduced amounts of asphaltenes, fines and other mineral material. With the process of the invention, the drawbacks involving material handling, mineral contamination of the separated bitumen, loss of solvents, hazards associated with solvent loss and handling, strict requirements of processed water and high heat requirements, are overcome.

The process of the invention importantly provides a greater flexibility with the processing of a variety of raw materials, namely oil sands of various and different locations and qualities. Additionally, the process permits options for production of a wide range of final products, ranging from refinery grade bitumen products to road paving asphalts.

The inventors of the invention disclosed herein have found that the key to an effective removal of inorganic material from water-wet or oil-wet oil sands, to thereby separate the bitumen and asphaltenes, is to employ a light aliphatic solvent which does not dissolve all of the organic material. According to the present invention, a complete dissolution of all of the organic mass is not a prerequisite for efficient separation of bitumen from oil sands, an observation which stands in direct contrast to common understanding in the field of bitumen extraction.

In one of its aspects, the present invention provides a process for the separation of inorganic material from unconditioned oil sands, the process comprising:
  (a) contacting unconditioned oil sands with at least one light aliphatic solvent, e.g., under conditions permitting dispersion of asphaltenes and dissolution, partially or wholly, of bitumen, optionally utilizing a grinding medium, to produce a mass;
  (b) transferring the mass obtained in step (a) into an agglomerator to allow agglomeration of at least a portion of fines and coarse inorganic material in said mass; and
  (c) separating the agglomerated inorganic material and the non-agglomerated coarse inorganic material from said mass, to obtain a slurry of organic material and non-agglomerated fines (of inorganic material, as defined hereinbelow).

"Oil sands" treated in accordance with the process of the invention, i.e., for the eventual separation of a bitumen fraction, may be any type of a hydrocarbon-containing solid such as oil-wet oil sands, water-wet oil sands, oil-bearing diatomite, oil shale, tar-saturated sandstones and any other natural solid source containing oil. Within the scope of the invention, the process disclosed herein may also be utilized in the separation of organic material from contaminated soils; in such embodiments, the organic material need not contain asphaltenes and/or bitumen but rather contain any contamination organic material of any nature, constitution and concentration.

In some embodiments, the invention is concerned with the recovery of bitumen and asphaltenes from unconditioned oil sands: unconditioned oil-wet or unconditioned water-wet sands.

As known in the art, in "water-wet" oil sands, the bitumen oil is not in direct contact with the inorganic mineral grains but instead separated therefrom by at least a thin film of water. On the contrary, in "oil-wet" oil sands, the bitumen oil is in direct contact with the mineral grains. It is also known that the significance of this distinction is that oil-wet oil sands are considered to be more difficult to beneficiate using the available techniques and methodologies because of the difficulties associated in the dislodging of the bitumen from the oil-wet surface.

The oil sands processed in accordance with the present invention are "unconditioned oil sands"; namely, the sands are contacted with the at least one light aliphatic solvent in accordance with the invention without being previously treated to e.g., enable separation of the organic material from the sands, in any way. The oil sands processed according to the invention are not pre-treated, prior to the contacting with the at least one light aliphatic solvent, by water wash, in-situ injection of steam, gas and/or other solvent, etc, or by any source of energy, e.g. sonication, irradiation, pressure or heat treatments, etc. In other words, the only pre-treatment possible under the definition of the present invention is size-diminution, e.g., grinding, crushing, etc, and heat treatment by any means available, e.g., steam, hot gas, hot solvent, etc, so as to adjust the temperature of the oil sands immediately prior to entry to the contactor and also possibly to facilitate removal of oxygen entrapped in the sands.

Thus, the process of the invention comprises, prior to step (a) above, one or more of: size diminution, heating of the sands and removal of oxygen from the sands.

In some embodiments, the oil sands processed according to the invention are substantially dry, namely containing no more than 10% w/w water, typically water present naturally within the sands. The process of the invention is particularly useful in the recovery of bitumen from oil sands without necessitating the use of large amounts of water for conditioning the sands, as existing processes do. Typically, the water in the sands is formation and connate water, the quantity of which may vary based on such parameters as the origin of the sands, the freshness of the oil sands, the time and temperature of transport of the sands to the processing plant, the conditions under which the oil sands are stored prior to processing, the chemical composition of the particular oil sands, the particular clay content and other parameters which affect the water concentration in the sands.

As known in the art, oil sands comprise inorganic materials of various particle sizes, water, and organic material. The "inorganic material" refers to a mineral material generally comprising sand, silt, fines, clays, other mineral particles, etc, which are in the form of particles. As used herein, the inorganic material is differentiated by particle size: particles which are larger than 44 microns are referred to herein as "coarse inorganic material" and particles which are smaller than 43.9 microns are referred to herein as "fine inorganic material" (fines).

Some of the inorganic material may be in the form of agglomerates free of organic material, while some of the inorganic material may be coated by a thin layer of organic material such as bitumen or asphaltenes. The inorganic agglomerates separated from the organic slurry in step (c) of the process, may comprise both coarse inorganic material and fines.

The "organic material" present in the sands is generally comprised of two main groups of materials:
  (i) "bitumen" —hydrocarbons and other organic compounds containing nitrogen, sulfur and/or oxygen atoms, these materials are operatively soluble in various organic solvents, including straight chain hydrocarbon solvents, such as pentane or hexane, at a temperature lower than 40° C.; and
  (ii) "asphaltenes" —high molecular weight organic material, aliphatic and/or aromatic (also naphthenic) compounds, containing also nitrogen, sulfur and/or oxygen molecules, wherein these materials are operatively insoluble in, e.g., pentane or hexane, under the same conditions.

In the natural untreated sands, the organic material and the inorganic material are mixed and may be characterized as water-wet or oil-wet sands. The ability to release the organic material from the inorganic material depends, inter alia, on the ability to break down or separate the existing inorganic grains from the organic mass. The separation made possible by the process of the invention is in fact disassociation of the organic material from the inorganic grains and formation of a multiphase slurry, as further detailed hereinbelow. Once the unconditioned sands are treated (contacted) with the at least one light aliphatic solvent, e.g., hexane, (step (a) of the process of the invention) at least a portion of the asphaltenes—being the high molecular weight fraction of the organic material—remains substantially undissolved, namely dispersed, (with the remaining amount of the asphaltenes being optionally at least partially soluble in said solvent); and at least a portion of the bitumen material—the low molecular weight fraction of the organic mass—becomes partially or wholly soluble in the solvent. The mass also comprises insoluble inorganic material, which in the subsequent step is partially agglomerated and removed, and also fines, part of which are associated with the organic material, and which separation from the organic material is achieved by appropriately carrying out the further steps of the process of the invention.

Once the agglomerated material is separated, as further disclosed hereinbelow, the slurry of step (c) is treated to eventually obtain bitumen liquor which is both free of fines and free of asphaltenes. The treatment of the slurry of step (c) may proceed in one of two alternative ways:

Alternative 1 (As depicted in FIG. 2)—treat the slurry of step (c) under conditions permitting separation of fines from the asphaltenes and bitumen, followed by selective separation of the bitumen liquor from the asphaltenes; or Alternative 2 (As depicted in FIG. 3)—treat the slurry of step (c) under conditions permitting separation of the bitumen liquor from the asphaltenes and fines associated therewith, followed by removal of fines from the asphaltenes.

The asphaltenes/fines fraction may be further treated to convert the asphaltenes into low molecular weight organic components (thermal cracking).

Irrespective of the conditions applied (Alternatives 1 or 2 disclosed above), the process of the invention permits an efficient means for the separation of three main fractions of the oil sands: bitumen, asphaltenes and inorganic material.

Thus, in some embodiments, the process follows Alternative 1, as depicted in FIG. 2, and further comprises:

(d) separating fines from the slurry obtained in step (c), under conditions permitting dissolution of at least a part of the asphaltenes, said separation being carried out e.g., by a centrifugal based means, such as centrifuge or hydrocyclone;

(e) treating the organic material (now substantially free of fines) under conditions permitting at least partial re-dispersion (fractionization) of the asphaltenes contained in said organic material; and (f) separating the asphaltenes from the organic material to obtain a substantially asphaltenes-free and fines-free bitumen liquor.

In some embodiments, water may be introduced to the slurry of step (d) and/or the liquor of step (f) prior to separation by centrifugal based means.

As used herein the phrase "conditions permitting dissolution of the asphaltenes", for example in reference to step (d) of the process, refers to heat and/or pressure treatment of the slum', to thereby at least partially break down the dispersion of the asphaltenes/fines and dissolve at least a portion of the asphaltenes into the liquor (solvent and bitumen). The dissolution of the asphaltenes may be a complete dissolution thereof or dissolution of any amount in the liquor. Thus, in some embodiments, prior to step (d) the slurry is treated by one or both of temperature and pressure to dissolve at least a part of the asphaltenes into the liquor.

Once the organic material, containing the bitumen and asphaltenes, has been dissolved in the liquor, separation of fines (non-agglomerated inorganic material) becomes possible. The resulting organic material, now substantially free of fines is then permitted to re-disperse or fractionate to separate the asphaltenes from the bitumen, each being substantially free of fines.

The re-dispersion of the asphaltenes is achieved by reducing one or both of temperature and pressure, so that the solubility of the asphaltenes in the liquor is reduced. Thus, the bitumen may be separated also free of asphaltenes.

The re-dispersion (fractionation) conditions may be applied for any required period of time so as efficient re-dispersion results. In some embodiments, the conditions are applied for a period of a few minutes to a few hours. In specific embodiments, the conditions may be applied for a period of between about 1 minute to about 240 minutes, namely, 1, 5, 10, 20, 30, . . . , 80, 90, . . . , 120, 130, . . . 180, 190, . . . , 230, or 240 minutes.

The re-dispersion process involves the reformation of an insoluble asphaltenes distinct phase, which becomes separated from the liquor. This may be enhanced and accelerated by the introduction of association seeds, such as a particulate hydrophobic inorganic material, a polymeric additive, a high molecular weight organic additive, an asphaltenes particulate material, etc. The material used for seeding may be external, namely added from an external source, or may by itself be a byproduct of the process, e.g., asphaltenes particulates formed during the re-dispersion process.

As used herein, bitumen "substantially asphaltenes free", or any lingual variation thereof, refers to a bitumen product comprising at most 10% w/w asphaltenes. In other embodiments, the bitumen product may comprise between about 0 and 5% w/w asphaltenes, i.e., 0, 1, 2, 3, 4, or 5% or any fraction thereof.

As used herein, bitumen or asphaltenes "substantially free of inorganic material" or "substantially free of fines" refers to a bitumen or asphaltenes product (fraction) comprising at most 0.2-0.8% w/w inorganic material (fines).

In some embodiments, the conditions applied to the slurry of step (c) prior to or during treatment by centrifugal based means, e.g., centrifugation, are one or both of temperature and pressure. In some embodiments, the slurry of step (d) is heated to a temperature of between about 50° C. and about 150° C., prior to or during treatment with centrifugal based means.

In some embodiments, the temperature applied is between about 50° C. and about 100° C., or between about 50° C. and about 90° C., or between about 50° C. and about 80° C., or between about 50° C. and about 70° C., or between about 50° C. and about 60° C.

In further embodiments, the temperature applied is between about 80° C. and about 150° C., or between about 80° C. and about 100° C., or between about 80° C. and about 90° C.

In other embodiments, the temperature applied is between about 62° C. and about 100° C., or between about 62° C. and about 90° C., or between about 62° C. and about 80° C., or between about 62° C. and about 70° C.

In other embodiments, a pressure of between about 1 bar and about 15 bars is applied to the slurry of step (d), prior to or during treatment with centrifugal based means. In some embodiments, the pressure is between about 1 bar and about 9 bar, between about 1 bar and about 8 bars, between about 1 bar and about 7 bars, between about 1 bar and about 6 bars, between about 1 bar and about 5 bars, between about 1 bar and about 4 bars, between about 1 bar and about 3 bars, or between about 1 bar and about 2 bars.

In other embodiments, the pressure is between about 5 bars and about 10 bars, between about 5 bars and about 9 bars, between about 5 bars and about 8 bars, between about 5 bars and about 7 bars, or between about 5 bars and about 6 bars.

In other embodiments, the pressure is between about 10 bars and about 15 bars, between about 10 bars and about 14 bars, between about 10 bars and about 13 bars, between about 10 bars and about 12 bars, or between about 10 bars and about 11 bars.

In additional embodiments, the pressure is 1, 2, 3, 4, 5, 6, 7, 8, 9, 10, 11, 12, 13, 14 or 15 bars.

In other embodiments, the process of the invention follows Alternative 2, as depicted in FIG. 3, wherein the slurry obtained in step (c) is treated by, e.g., centrifugal based means (e.g., at a temperature between about 30° C. and 62° C. and atmospheric pressure), to separate asphaltenes and fines associated therewith from the bitumen liquor (to thereby obtain bitumen liquor substantially free of asphaltenes and fines). The asphaltenes and fines may subsequently be further treated, e.g., centrifuged, to selectively separate the fines from the asphaltenes. In some embodiments, the asphaltenes and the fines are heated to a temperature of between about 50° C. and about 150° C., prior to or during treatment by e.g., centrifugal based means.

In some embodiments, the temperature applied is between about 50° C. and about 100° C., or between about 50° C. and about 90° C., or between about 50° C. and about 80° C., or between about 50° C. and about 70° C., or between about 50° C. and about 60° C.

In further embodiments, the temperature applied is between about 80° C. and about 150° C., or between about 80° C. and about 100° C., or between about 80° C. and about 90° C.

In other embodiments, the temperature applied is between about 62° C. and about 100° C., or between about 62° C. and about 90° C., or between about 62° C. and about 80° C., or between about 62° C. and about 70° C.

In other embodiments, the asphaltenes and fines are pressure treated with a pressure of between about 1 bar and about 15 bars. In some embodiments, the pressure is between about 1 bar and about 9 bar, between about 1 bar and about 8 bars, between about 1 bar and about 7 bars, between about 1 bar and about 6 bars, between about 1 bar and about 5 bars, between about 1 bar and about 4 bars, between about 1 bar and about 3 bars, or between about 1 bar and about 2 bars.

In other embodiments, the pressure is between about 5 bars and about 10 bars, between about 5 bars and about 9 bars, between about 5 bars and about 8 bars, between about 5 bars and about 7 bars, or between about 5 bars and about 6 bars.

In other embodiments, the pressure is between about 10 bars and about 15 bars, between about 10 bars and about 14 bars, between about 10 bars and about 13 bars, between about 10 bars and about 12 bars, or between about 10 bars and about 11 bars.

In additional embodiments, the pressure is 1, 2, 3, 4, 5, 6, 7, 8, 9, 10, 11, 12, 13, 14 or 15 bars.

In further embodiments, the asphaltenes and the fines may be treated with a solvent capable of dissolving at least a portion of the asphaltenes, so as to solubilize the asphaltenes and enable removal of fines. In such embodiments, prior to the introduction of the solvent, the residual amount of the at least one light aliphatic solvent, which may be still present, may be removed by means known in the art.

In some embodiments, further treatment with centrifugal based means permits efficient removal of residual amounts of fines. The solvent employed for the dissolution of the asphaltenes may be selected amongst e.g., aliphatic solvents, e.g., hexanes, benzene, toluene, xylenes, naphtha, chlorinated solvents such as chloroform, trichloromethane, tetrachloromethane, trichloroethane, limonene and mixtures thereof.

In some embodiments of the process of the invention, independent of the conditions of Alternatives 1 or 2, the amount of asphaltenes in the bitumen liquor which is obtained does not exceed 10%. In other embodiments, the amount of asphaltenes in the bitumen liquor is at most 1, 2, 3, 4, or 5% w/w asphaltenes. In some further embodiments, the bitumen liquor comprises at most 1% w/w asphaltenes.

In some other embodiments, the bitumen liquor contains at most 0.2-0.8% w/w inorganic material.

In other embodiments, the at least one light aliphatic solvent is selected amongst such having a boiling point lower than about 100° C. In some embodiments, the at least one light aliphatic solvent has a boiling point ranging between 30° C. and 100° C.

In other embodiments, the at least one light aliphatic solvent is selected from pentane, hexanes, e.g., n-hexane, iso-hexane, neo-hexane, cyclohexane, and heptane, and any mixture thereof.

In the process of the invention, the separation of step (c) is carried out in an apparatus selected from a clarifier, a classifier, mechanical separation by size, e.g., sieving means, a centrifuge, or a sedimentation tank, or any combination thereof. In some embodiments, the slurry is first classified by a classifier, followed by clarifier, e.g., a gravitational clarifier, optionally followed by centrifugal separation means, e.g., centrifugation, hydrocyclone, etc.

In some other embodiments, at least one binding agent is added into the agglomerator of step (b), the binding agent being selected from water, an aqueous media, lime gypsum slurry, a flocculant and mixtures thereof. In some embodiments, the binding agent is added in an amount between 0.1% wt and 0.5% wt.

In some embodiments, the agglomerated inorganic material, after its separation (step (c)), is loaded on a vacuum filter belt equipped with a counter-current washing, permitting separation and washing thereof.

In accordance with the present invention any of the solvents employed in the process, as defined herein, may be recovered.

When the solvent(s) are recovered, the recovery process may comprise washing any of the separated fractions, e.g., the agglomerated material, with water, and allowing the solvents to drain therefrom. The water may be maintained at a temperature between about 20° C. and about 85° C.

In some embodiments, the washed agglomerated material is transferred into a separation vessel for gravitational separation of the liquid media (solvent and water) based on their relative densities.

In some embodiments, the separation vessel is a deep cone thickener. When the separation vessel is a deep cone thickener, the solvent is recovered as an overflow and the water is withdrawn as a middling stream and recycled.

As may be realized by the person skilled in the art, the process of the invention for the separation of inorganic material from oil sands and the isolation of bitumen and/or asphaltenes, each being substantially free of inorganic material, may interchangeably be regarded as a process for the separation of bitumen or asphaltenes from oil sands. Also the process of the invention, as claimed, may be equally regarded as a process for the separation of the organic material from the inorganic material.

In another of its aspects, the invention also provides a process for separation of a bitumen and/or asphaltenes from oil sands, the process comprising:
(i) treating oil sands to separate therefrom insoluble inorganic material, e.g., to obtain a sand-free oil;
(ii) treating the sand-free oil under conditions permitting dissolution of the organic material in a solvent medium to separate therefrom fines;
(iii) treating the dissolved organic material under conditions permitting dispersion of the asphaltenes contained therein; and
(iv) separating the asphaltenes from the bitumen liquor to obtain a substantially asphaltenes-free and fines-free bitumen liquor.

In some embodiments, the sand-free oil of step (ii) is heated prior to or during separation of the fines by, e.g., treatment with centrifugal based means, to a temperature of between about 50° C. and about 150° C., prior to or during treatment with centrifugal based means (process step (ii)).

In some embodiments, the temperature applied is between about 50° C. and about 100° C., or between about 50° C. and about 90° C., or between about 50° C. and about 80° C., or between about 50° C. and about 70° C., or between about 50° C. and about 60° C.

In further embodiments, the temperature applied is between about 80° C. and about 150° C., or between about 80° C. and about 100° C., or between about 80° C. and about 90° C.

In other embodiments, the temperature applied is between about 62° C. and about 100° C., or between about 62° C. and about 90° C., or between about 62° C. and about 80° C., or between about 62° C. and about 70° C.

In other embodiments, a pressure of between about 1 bar and about 10 bars is applied to the sand-free oil of step (ii), prior to or during separation of the fines by, e.g., treatment with centrifugal based means. In some embodiments, the pressure is between about 1 bar and about 9 bar, between about 1 bar and about 8 bar, between about 1 bar and about 7 bar, between about 1 bar and about 6 bar, between about 1 bar and about 5 bar, between about 1 bar and about 4 bar, between about 1 bar and about 3 bar, or between about 1 bar and about 2 bar, In other embodiments, the pressure is between about 5 bar and about 10 bar, between about 5 bar and about 9 bar, between about 5 bar and about 8 bar, between about 5 bar and about 7 bar, or between about 5 bar and about 6 bar.

In additional embodiments, the pressure is 1, 2, 3, 4, 5, 6, 7, 8, 9 or 10 bars.

In further embodiments, the sand-free oil may be treated with a solvent so as to solubilize the asphaltenes to enable removal of the fines.

In some embodiments, the oil sands used in the process of this aspect of the invention are native bitumen (asphalt) which contains no more than 15% wt inorganic material (sands and fines). When native bitumen is processed according to this aspect of the invention, initial separation of coarse material, namely sands, in accordance with step (i) is not be required. Thus, where native bitumen is processed in accordance with a process of the invention, the process comprises:
(i) treating the native bitumen under conditions permitting dissolution of the organic material in a solvent medium to separate therefrom fines;
(ii) treating the dissolved organic material under conditions permitting dispersion of the asphaltenes contained therein; and
(iii) separating the asphaltenes from the bitumen liquor to obtain a substantially asphaltenes-free and fines-free bitumen liquor.

In another one of its aspects the present invention provides a product selected from bitumen, asphaltenes, and a mixture thereof, being substantially free of inorganic material, the product obtained (obtainable) by a process as defined herein.

In some embodiments, the bitumen product is substantially free of asphaltenes and inorganic material. In other embodiments, the asphaltenes are substantially free of bitumen and/or inorganic material.

It should be understood that various modifications to embodiments of any one of the processes of the invention may be made. Therefore, the above description should not be construed as limiting, but merely as exemplification of a full process or a part of a process according to the invention. The skilled in the art will envision other modifications within the scope and spirit of the claims appended hereto.

Despite the fact that main embodiments of the invention are directed at the efficient recovery of bitumen from the oil-sands, the present invention may be regarded as being directed equivalently to the recovery of asphaltenes and removal of the bituminous material. As the artisan would appreciate, both definitions provided for the process of the invention are equivalent.

General Description of the Invention

In the process of the invention, bitumen recovery from oil sands is facilitated by the grinding and subsequent agglomeration of inorganic particles, i.e. sand, so that separation and recovery of the bitumen are better executed, and generation of fines is minimized. In the process of the invention, this optimization is achieved by carrying out the extraction process with a light aliphatic solvent, in a crushing/extraction step, followed by solids agglomeration.

Thus, the invention generally provides a process for the removal/separation of sand and fines material from oil sands, said process comprising contacting the unconditioned oil-sands with a light aliphatic solvent permitting dissolution of the bitumen and dispersion of the asphaltenes, followed by agglomeration of the inorganic material, and thereafter separation of the agglomerated material by a variety of means, as disclosed herein.

In the traditional solvent extraction processes, such as those used in the Canadian commercial operations, as disclosed in CA 1,068,228, the oil is extracted by a two-stage process. Initially, the oil is separated from the sand by washing with hot water and next the resulting bitumen, containing approximately 10% mineral matter and up to 30% water is further purified by mixing with a light solvent and further separation steps using a variety of settling and centrifugation stages follow.

The water-extraction process owes its success to oil sands which are water-wet. Most oil sands in the world, however, are oil-wet and are, therefore, not amenable to recovery by a water-washing process. While alternative solvent-based processes were developed, eliminating the first water-washing step, including the Solvent Extraction Spherical Agglomeration (SESA) process disclosed in U.S. Pat. No. 4,719,008, the RTR process disclosed in U.S. Pat. No. 7,128,375 and the Solvex process disclosed in U.S. Pat. No. 5,124,008, none of these processes was developed commercially, because of the success and widespread application of water-extraction processes.

In a series of experiments conducted by the inventors, it was found that the asphaltenes do not readily dissolve in light aliphatic solvents such as hexane, or in solutions thereof containing bituminous material. In addition, it was found that a substantial part of the fines were intimately associated with the asphaltenes, preventing their separation by conventional means, such as clarifiers. The use of the light aliphatic solvents thus allowed the formation of a multiphase, enabling further separation processes for efficient and nearly complete removal of inorganic materials from the bitumen, thereby producing clean and high quality bitumen, in competitive cost.

Unlike the process of the invention, processes of the art employed solvents which were at least partially capable of dissolving the asphaltenes during the extraction stage. As a result, solvents such as naphtha which better dissolve the heavier asphaltenes have been used. The solvent used in the process of the invention is selected amongst light aliphatic organic solvents which, on the one hand, are capable of, partially or wholly, dissolving the bitumen material, e.g., particularly the low and/or medium molecular weight material, upon contact, to produce a solution (a liquor) thereof, and on the other hand does not permit the complete dissolution of the asphaltene material. This enables the dispersion of asphaltenes at the first stages of the process, and dissolution of the asphaltenes at the later stages of the process in order to further separate inorganic material, resulting in bitumen and asphaltene products which are substantially free of inorganic material.

It should be noted that under some configurations the asphaltene solubility in the solvent/bitumen solution (the liquor) increases, as in fact the soluble bituminous material acts as a co-solvent and increases the asphaltene solubility in the hexane/co-solvent system. Thus, in some embodiments of the invention, highly concentrated bitumen solutions are not desired and are in fact to be avoided. In such embodiments, the liquor should comprise up to 80% bitumen, e.g., no more than 80%, 75%, 70%, 65% or 60% bitumen. In some embodiments, the liquor comprises between 20 and 80% bitumen, and in further embodiments between 25 and 65% bitumen.

The solvent may be a single organic solvent, e.g., hexane, or a mixture of hexane isomers with one or more such solvents. The solvent is not water or a mixture with water.

In some embodiments, the organic solvent is selected amongst light aliphatic solvents or mixtures thereof, said light aliphatic solvents or mixture thereof being selected amongst such having a boiling point lower than about 100° C. In some embodiments, the solvent or mixture employed has a boiling point ranging between 30 and 100° C. In further embodiments, the organic solvent is selected from pentane, n-hexane, iso-hexane, neo-hexane, cyclohexane, and heptane, and any mixture thereof.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
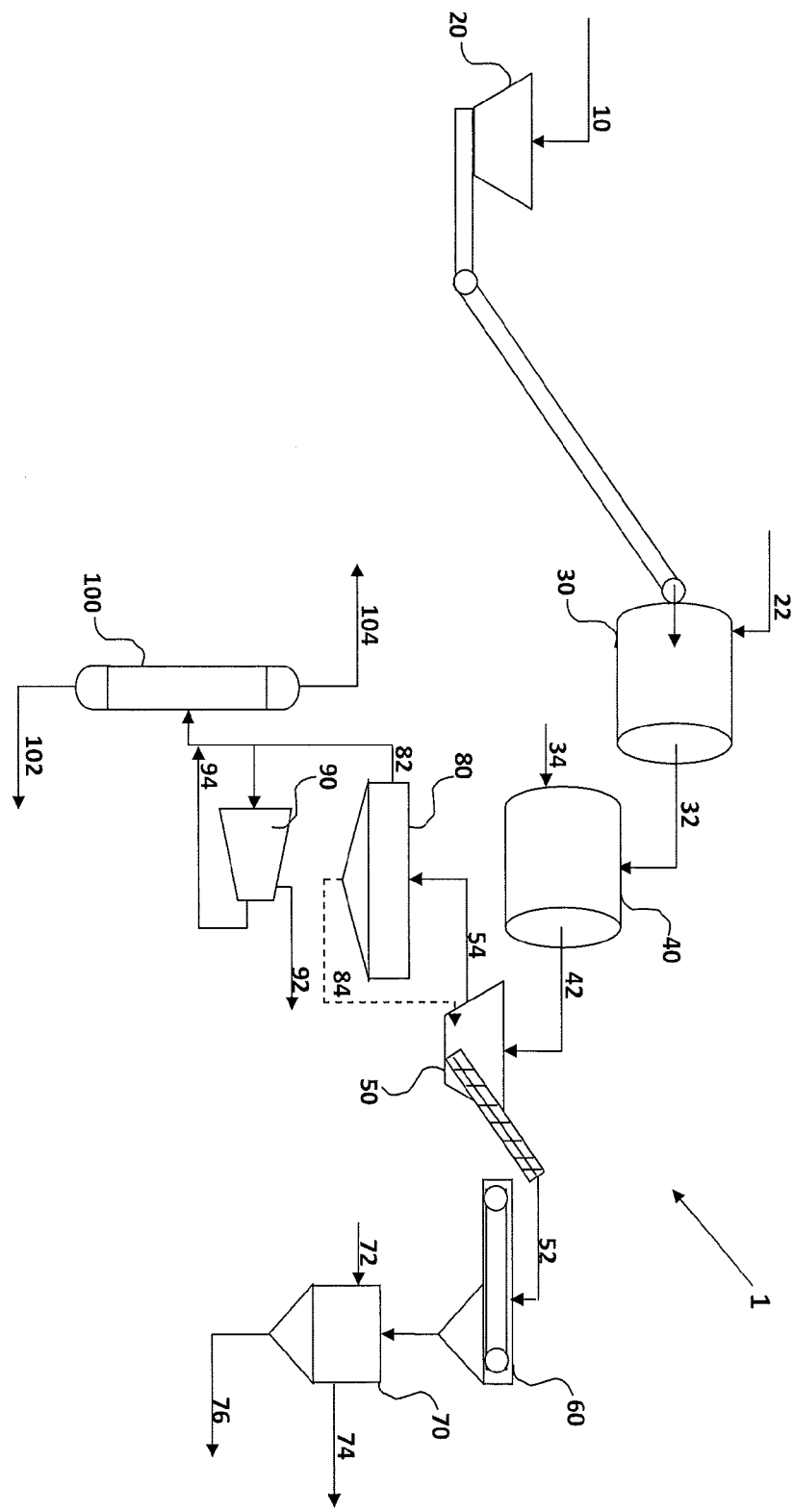
FIG. 1 is a schematic representation of a process according to the invention.

Various embodiments and aspects of the process of the invention as delineated hereinabove and as claimed in the claims section below find support in the following description and non-limiting examples.

The process is carried out by contacting and agglomerating the oil sands in separate vessels. In a first stage of the process, the mined oil sands (mined from any depth and employing any means known in the art) are crushed to reduce in size the naturally existing large rocks and stone material. Without this crushing stage, small concentrations of bitumen-containing minerals aggregates may remain in the mass and may reduce the efficiency of the overall recovery. Thus, the grinding is carried out in the presence of a solvent, so that a larger surface area of the oil sand is exposed to interaction with the solvent. At the same time, it may be expected that the grinding of the sands in the contactor may increase the amount of fines present and thereby hinder the subsequent separation stages. However, the subsequent steps of the process of the invention reduce the effect imposed by the existing fines and allow higher recovery yields of the organic products For example, in a process for extraction of oil from oil-wet sands, extraction using a single contactor/agglomerator yielded only 70% oil recovery. Oil recovery with the same sample, but using the two-stage process according to the invention increased to over 90%.

The mass from the contactor is subsequently transferred into an agglomerator, and treated under conditions permitting the formation of a multiphase, containing, in some cases 7 or more different phases:

1. solution of bitumen and low polarity, low molecular weight asphaltenes in solvent (liquor);

2. dispersed asphaltenes, solvent-swelled;

3. dispersed asphaltenes of high molecular weight and/or high polarity that partially form associated particles with fine clay;

4. sand particles with an associated/bound organic material, wherein generally the bitumen layer coating such particles is mostly thinner than 50 nm in size;

5. sand particles, clays and silts, in agglomerated form;

6. regions containing water droplets having a diameter smaller than 100 µm; and 7. regions containing water droplets larger than 250 µm.

It should be noted that while the multiphase system is described as a 7-phase system, at any point of time during execution of the process of the invention, it may be characterized as constituting of a smaller number of phases, depending on such parameters as temperature, type of oil sand used, specific conditions employed, solvent, water content, time from initial contacting and agglomerating etc.

The agglomerator employed may be in the form of a rotating vessel or in a mixer, not necessarily operating under the same conditions employed in the step of grinding. Both the grinding and agglomeration steps in fact condition the oil sands for efficient recovery during the subsequent process steps, and at the same time minimize the effect of fines and clay materials, which are the most difficult to deal with in the separation process.

In the subsequent step of the process, the agglomerated material is separated by any means known in the art, i.e. an apparatus, or a series of such apparatuses, which may or may not be in liquid or solid communication which each other, capable of separating solid particulates from the dissolved organic material. The apparatus may be a classifier, a clarifier, a centrifuge, a hydrocyclone, an agglomerator or any other such apparatus, or any combination of one or more of such apparatuses. The agglomerated material may then be loaded on a vacuum filter belt equipped with a counter-current washing, and further stripped of solvent.

Once the agglomerated material is separated, the slurry of step (c) of the process is treated to eventually obtain bitumen liquor which is both free of fines and free of asphaltenes. The treatment of the slurry of step (c) may proceed in one of two ways:

1. treat the slurry under conditions permitting separation of the non-agglomerated material, followed by selective separation of the bitumen from the asphaltenes components of the organic material. In such embodiments, the slurry is treated under elevated temperature and/or pressure conditions so as to dissolve the asphaltenes into the liquor. This reduces significantly the viscosity of the slurry, and enables efficient separation, i.e. by centrifugal-based means, of the fines from the solution. The asphaltenes are then re-dispersed in the bitumen liquor, and further separated, i.e. centrifuged, to obtain bitumen liquor substantially free of asphaltenes and fines, and asphaltenes substantially free of fines.

2. treat the slurry under conditions permitting separation of the asphaltenes and the fines associated therewith, followed by conditions permitting selective separation of the asphaltenes: in such embodiments, the slurry is subjected to further separation, i.e. by centrifugal-based means, to afford a bitumen liquor comprising solvent and bitumen substantially free of asphaltenes and fines, and a stream comprising solvent, asphaltenes and fines. The asphaltenes and fines are subsequently further treated under conditions of elevated temperature and/or pressure, to dissolve the asphaltenes and permit the fines (formerly associated to the asphaltenes) to become unassociated therewith. Under the conditions employed, the viscosity of the asphaltenes is significantly reduced, allowing a better separation of the fines. Following the separation, asphaltenes substantially free of non-agglomerated inorganic material are obtained.

The bitumen liquor which is recovered may be stripped of the solvent and upgraded into high quality bitumen employing any one method of the art. Also, after extraction and recovery of the bitumen, it may be further processed in a refinery. The upgrading of the bitumen, produced according to a process of the invention, may include coking/hydrocoking—adding hydrogen and removing carbon—so as to produce a more valuable hydrocarbon product. Further refining into fuels of various types and for various purposes, e.g., gasoline, diesel fuel, may also take place.

According to certain configurations, after separation of the asphaltenes from inorganic material, the asphaltenes may optionally be used as a fuel source in the process or as a byproduct of the factory for further treatment by thermal cracking and potentially as a paving material.

In some cases it is required to introduce into the agglomerator, during processing, at least one binding agent or a mixture thereof, typically in an amount ranging from 0.1-0.5 wt % to enhance agglomeration of the inorganic material. The binding agent is selected from water, an aqueous media, lime or gypsum slurry and mixtures thereof. The binding agent may also be at least one flocculant selected from an electrolyte, a polymer such as polyacrylamides, lime, starch-derived flocculants, and other commonly used materials.

The process of the invention may also include the recovery of the solvent, e.g., by means evaporation or distillation, and may involve additional treatment of the solvent stream by a thermal cracker to produce light organic components.

One of the major drawbacks to solvent-based processes, such as those known in the art, is the difficulty of recovering solvent from large volumes of extracted and washed mineral masses. As such a process consumes large amounts of energy, rendering the process only marginally economic, a solvent recovery process was also developed (which may or may not be associated with any one process of the invention). In fact, the solvent recovery process, of the invention may be employed in any existing solvent-extraction processes known in the art.

Thus, it is the purpose of the present invention to also provide a process for solvent recovery which comprises washing with cold water the separated inorganic material and allowing the solvents to drain therefrom. In this process, efficient and high solvent recoveries are achieved with low energy consumption. Water recycle was maintained at high efficiency by use of settling aids which enhance clarification and eliminate problems of slimes in tailings ponds.

Thus, the invention also provides a process for recovery of solvents, e.g., light aliphatic solvents employed in the process of the invention, said process comprising:

mixing, e.g., without breaking apart the agglomerated material with water; and separating the recovered solvent from the water.

The process may be repeated one or more times in order to maximize the recovery of the solvent.

The water may be maintained at a temperature between about 20° C. and about 85° C. The separation of solvent from the water according to the process of the invention may be carried out at atmospheric pressure, at reduced pressure between 0.2 atmospheres to −0.8 atmospheres, or at pressure greater than atmospheric pressure.

The washed agglomerated material is transferred into a separation vessel to allow gravitational separation of the liquid media (solvent and water) based on their relative densities. The separation vessel may be a deep cone thickener, from which the solvent is recovered as an overflow and the water is withdrawn as a middling stream. The water may then be recycled. The solid material which is also present, may be disposed from the vessel by, e.g., pumping.

With respect to the water wash and solvent recovery system and process disclosed herein, it should additionally be noted that the total heat evolved in the process may be recovered by the following:

1. minimizing solvent evaporation by a first water wash, as disclosed above;

2. the evaporated solvent and water is used where warm water or stream drying is employed, e.g., in a screw conveyor, by compressing the solvent vapor and use the latent heat associated with the phase change as a heating media. Solvent-water separation may be subsequently carried out;

3. heat recovery from water/sand slurry by the usage of any of the methods (direct re-use of hot water, mixing the warm sand with fresh water for the final wash step, use of a second washing water step) and use of heat pump to extract the heat absorbed in the sand to warm a feed or more specifically warm the contactor.

In another aspect of the invention, there is provided an upgraded bitumen product, as defined herein. In some embodiments, the product is obtained (or obtainable) from a process according to the invention.

As demonstrated herein, the bitumen product is of high quality and may have one or more of the following characterizations in comparison to bitumen products obtained by employing other processes of the art:
(1) higher API gravity than the current planned product,
(2) lower viscosity (easily flows so less diluents will be needed),
(3) lower fines, such product would be of refinery grade,
(4) lower in sulfur and in heavy metals.

EXAMPLE 1

In a 2-stage process according to the invention, employing a contactor and an agglomerator, the following conditions are employed:
Temperature of both vessels is 50° C. or higher;
Retention time, grinding stage—2-6 minutes; and
Retention time, agglomeration stage—2-4 minutes.
In some specific cases, the process may involve 4 minutes of grinding and 2 minutes of agglomeration.
For the solvent recovery stage, the water temperature employed is from 10 to 25° C. In specific cases, the water temperature may be 20° C.

EXAMPLE 2

In FIG. 1 an exemplary process 1 for the treatment of oil sands, according to the invention, is demonstrated. Oil sands are first conditioned by breaking the large sand lumps into useable size lumps 10 and are then fed into a feeder 20 from which the sized oil sands are transported into a contactor vessel 30 in which the sands are milled and simultaneously contacted with a hydrocarbon such as hexane 22. The bitumen/solvent slurry produced 32 is then transferred into an agglomerator 40 into which a small amount of water may be added 34. The agglomerates formed 42 in the agglomerator 40 are then classified 50 to produce agglomerated sands 52 (underflow of classifier) and liquor with fines 54 (overflow of the classifier). The classified agglomerates and sands 52 are filtered by a belt-filter 60 and the filter cake is washed with fresh solvent. The filtrate obtained is returned after washing (diluted liquor) and is again contacted with fresh oil sands. Next, the washed filter cake is fed to solvent stripping (by, e.g., fluidized bed dryer) 70, with steam fed thereto 72 and the dried sands 76 are discarded. The solvent 74 may be recovered. The classifier overflow 54 from the classifier 50, composed of bitumen liquor and fines is clarified 80, forming clarified liquor 82 (clarifier overflow final product) and settled non-agglomerated fines 84 (clarifier underflow).

The underflow 84 may be re-circulated to the classifier 50 for secondary agglomeration.

Alternatively, in place of re-circulating the underflow for secondary agglomeration, the fines may be transferred into a water-wet region where they may be trapped and removed.

However, in some cases, as tests and investigations demonstrated, part of the fines that are associated with organic material, do not settle in the clarifier. Agglomeration of this material was found problematic: these fines are at least partially hydrophobic, thus agglomeration by water is questionable, and recirculation of these fines led to high fines concentration build up. Also, the theoretical capture of asphaltenes in the agglomerates, may possibly also lead to organic material losses. Thus, entrapment of most of the liquor of organic material and fines by centrifuge was introduced to the process.

The centrifuge 90 performed the function of the clarifier, i.e. could replace the clarifier or be used as a finishing operation for removal of residual particulate material that was not removed in the clarifier. In some configurations, however, both a clarifier 80 and a centrifuge 90 have been used. The fines-free bitumen liquor 82 can be treated by the centrifuge 90, separating therefrom inorganic fines 92, which is then discarded. The fines-free bitumen liquor 94 is re-circulated to the overflow clarifier stream 82, and is subsequently treated in a distillation column 100, to recover bitumen oil 102, and solvent 104.

EXAMPLE 3

Figure 2:
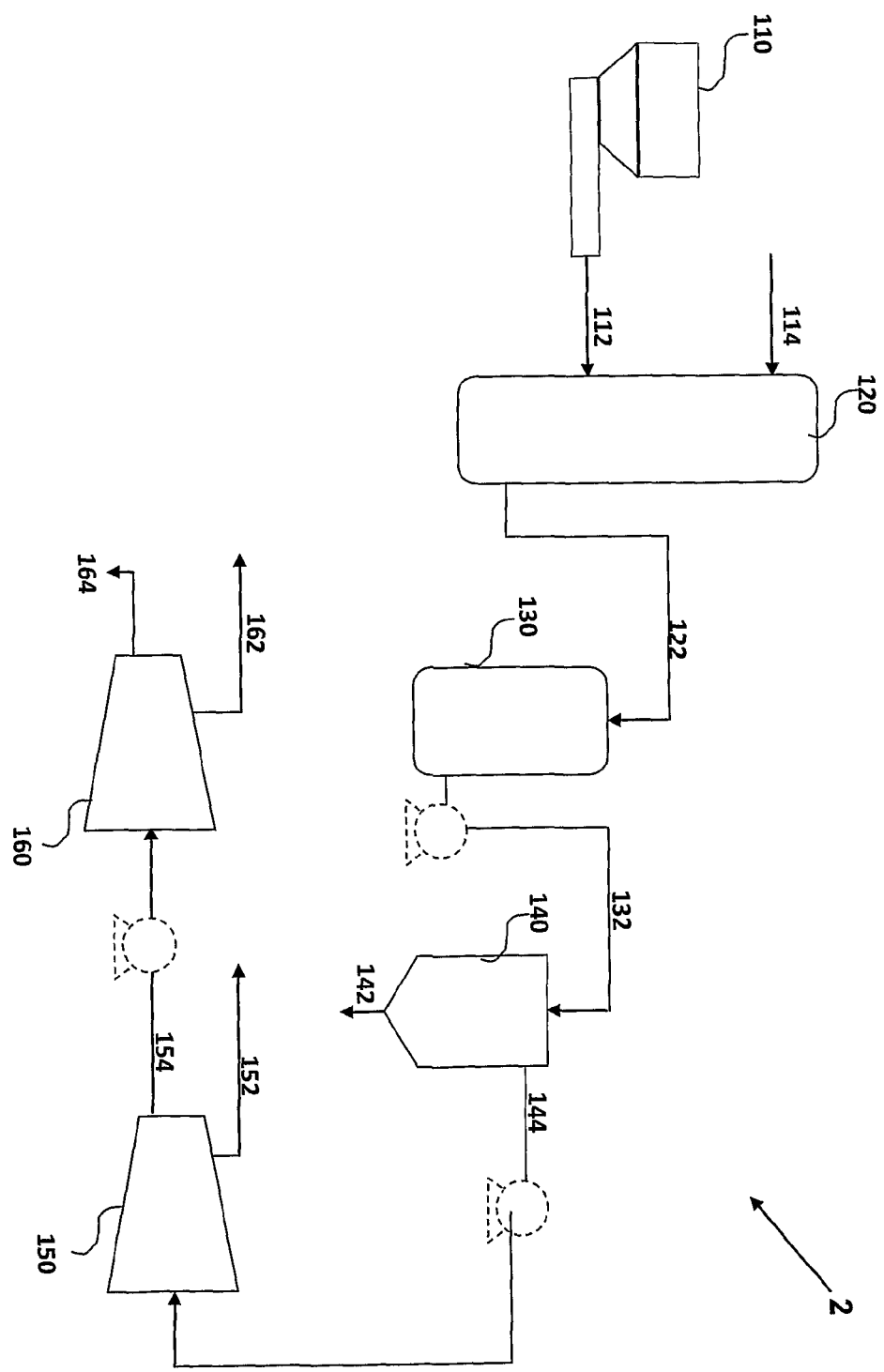
FIG. 2 is a schematic representation of a further process according to the invention.

In FIG. 2 an exemplary process 2 for the treatment of oil sands, following a process according to the invention is demonstrated. Oil sands are first treated by breaking the large sand lumps into useable size lumps and are then fed into a feeder 110 from which the sized oil sands 112 are transported into a contactor vessel 120 in which the sands are milled and simultaneously contacted with a light aliphatic solvent such as hexane 114. The produced mass 122 is then transferred into an agglomerator 130. The agglomerates formed in the agglomerator 132 are then separated by a clarifier 140 to produce agglomerated material 142 (underflow of classifier) and a slurry 144 comprising solvent, dissolved bitumen, dispersed asphaltenes and non-agglomerated inorganic material (overflow of the classifier). The classifier overflow 144 from the classifier 140, is treated under conditions permitting the dissolution of asphaltenes into the liquor, i.e. heating to temperatures between about 50° C. and about 150° C. and pressure of between about 1 bar and about 10 bar. The slurry is then centrifuged 150, separating the fines 152 from the organic material 154, comprising dissolved bitumen and dissolved asphaltenes, substantially free of inorganic material. The organic material 154 is then treated, i.e. by reducing the temperature and/or pressure, to re-disperse the asphaltenes, and further separate dispersed asphaltenes by a centrifuge 160, resulting in bitumen 162 and asphaltenes 164, each being substantially free of inorganic material.

EXAMPLE 4

Figure 3:
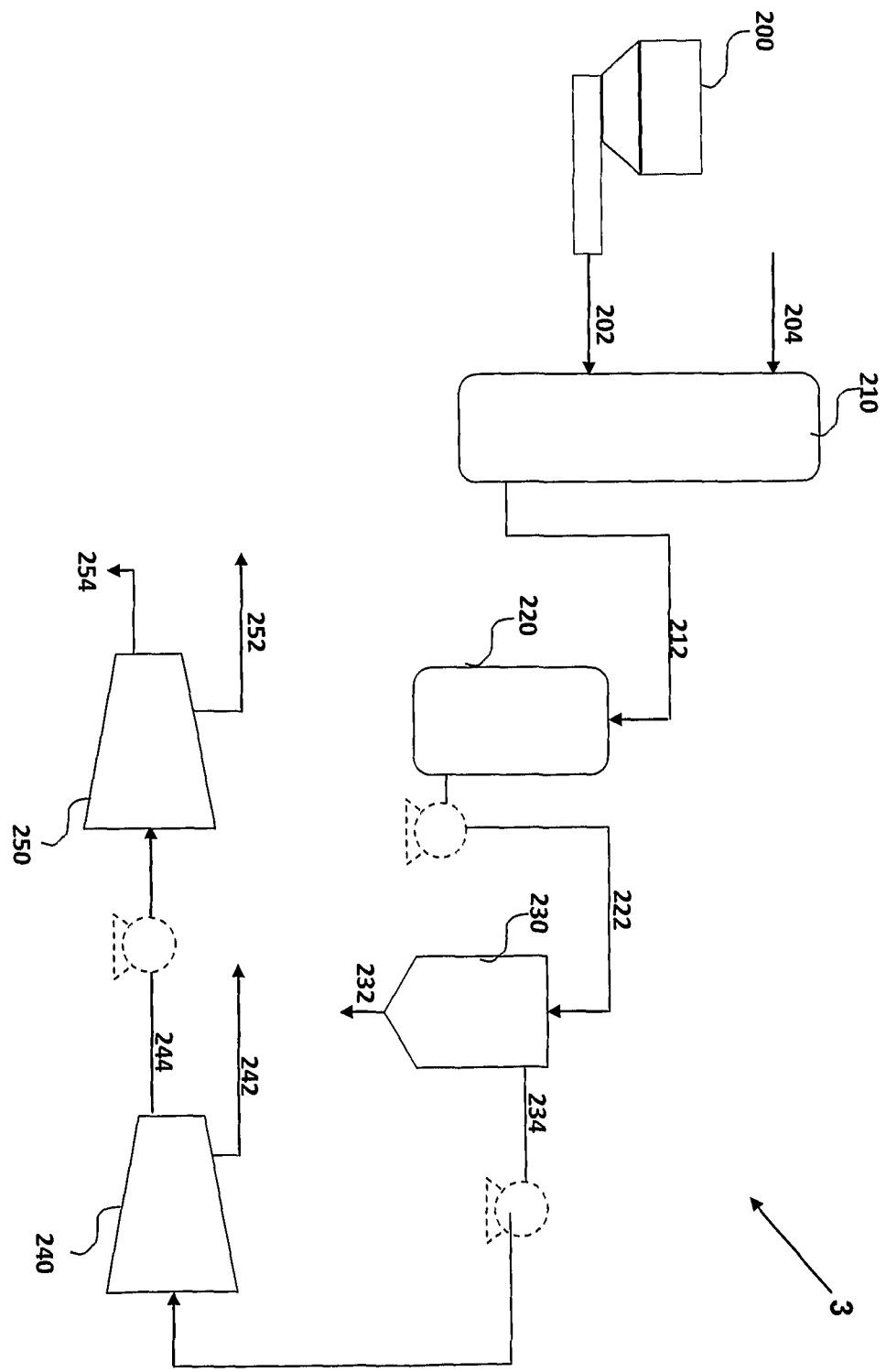
FIG. 3 is a schematic representation of a further process according to the invention.

In FIG. 3 another exemplary process 3 for the treatment of oil sands, following a process according to the invention is demonstrated. Oil sands are first treated by breaking the large sand lumps into useable size lumps and are then fed into a feeder 200 from which the sized oil sands 202 are transported into a contactor vessel 210 in which the sands are milled and simultaneously contacted with a light aliphatic solvent such as hexane 204. The produced mass 212 is then transferred into an agglomerator 220. The agglomerates 222 formed in the agglomerator 220 are then separated by a clarifier 230 to produce agglomerated material 232 (underflow of classifier) and a slurry 234 comprising solvent, dissolved bitumen, dispersed asphaltenes and non-agglomerated inorganic material (overflow of the classifier). The classifier overflow from the classifier 230 is centrifuged 240, separating the slurry into bitumen liquor 242 substantially free of asphaltenes and inorganic material and a bottom phase 244, comprising solvent, asphaltenes and non-agglomerated inorganic material. The bottom phase 244 can then be treated, i.e. by elevated temperature and/or pressure, to dissolve the asphaltene, and further separate the fines from the asphaltene by a centrifuge 250, resulting in separation of fines 252 from asphaltenes 254.

EXAMPLE 5

Figure 4:
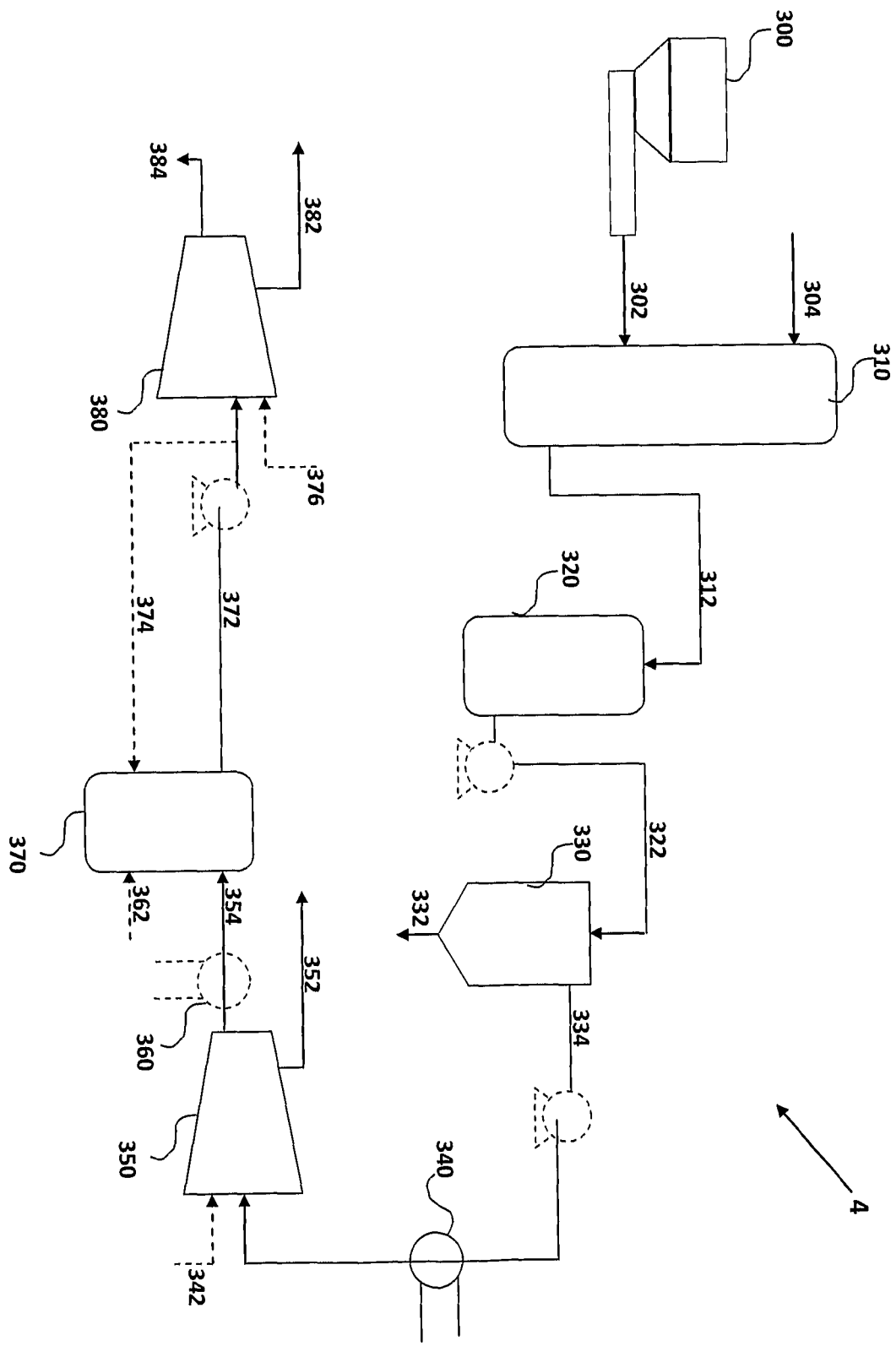
FIG. 4 is a schematic representation of one modification of the process depicted in FIG. 2.

In FIG. 4 another optional exemplary process 4 for the treatment of oil sands, following a process according to the invention is demonstrated. Oil sands are first treated by breaking the large sand lumps into useable size lumps and are then fed into a feeder 300 from which the sized oil sands 302 are transported into a contactor vessel 310 in which the sands are milled and simultaneously contacted with a light aliphatic solvent such as hexane 304. The produced mass 312 is then transferred into an agglomerator 320. The agglomerates formed in the agglomerator 322 are then separated by a clarifier 330 to produce agglomerated material 332 (underflow of classifier) and a slurry 334 comprising solvent, dissolved bitumen, dispersed asphaltenes and non-agglomerated inorganic material (overflow of the classifier). The classifier overflow 334 from the classifier 330, is treated under conditions permitting the dissolution of asphaltenes into the liquor, i.e. heating to temperatures between about 50° C. and about 150° C. by a heat exchanger 340, and pressure of between about 1 bar and about 10 bars. The heated slurry is then centrifuged 350, optionally with addition of water 342, separating the fines 352 from the organic material 354, comprising dissolved bitumen and dissolved asphaltenes, substantially free of inorganic material. The organic material 354 is then treated, optionally by a heat exchanger 360, to thereby reduce the temperature and to re-disperse the asphaltenes in a sedimentation tank 370, optionally by the addition of association seeds 362. The organic material 372 is then further separated by a centrifuge 380, optionally with the addition of water 376, resulting in bitumen 382 and asphaltenes 384, each being substantially free of inorganic material. Some of the re-dispersed asphaltenes may be re-circulated 374 to the sedimentation tank 370 to be used as potential association seeds.

EXAMPLE 6

Figure 5:
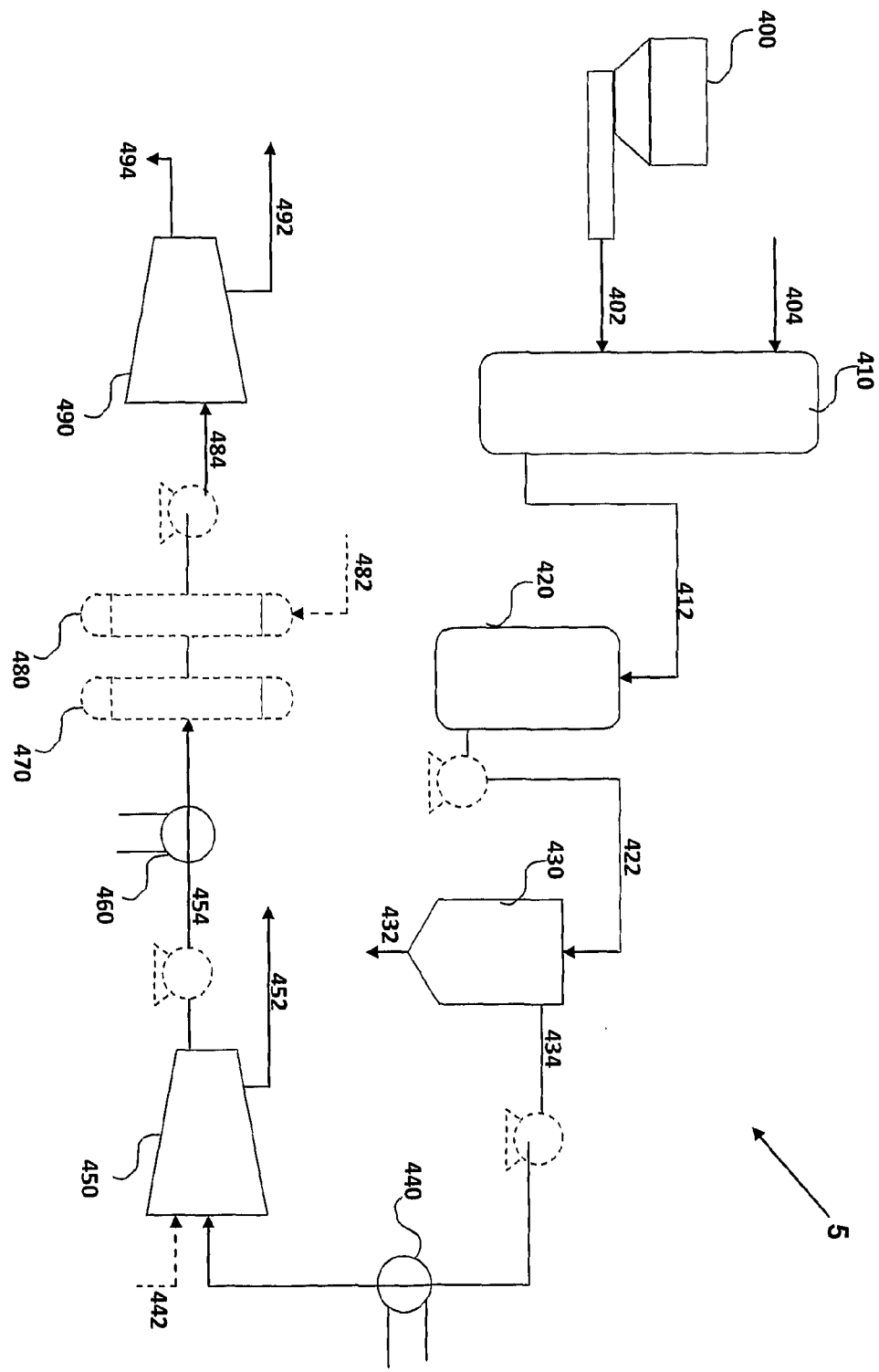
FIG. 5 is a schematic representation of one modification of the process depicted in FIG. 3.

In FIG. 5 another exemplary process 5 for the treatment of oil sands, following a process according to the invention is demonstrated. Oil sands are first treated by breaking the large sand lumps into useable size lumps and are then fed into a feeder 400 from which the sized oil sands 402 are transported into a contactor vessel 410 in which the sands are milled and simultaneously contacted with a light aliphatic solvent such as hexane 404. The produced mass 412 is then transferred into an agglomerator 420. The agglomerates 422 formed in the agglomerator 420 are then separated by a clarifier 430 to produce agglomerated material 432 (underflow of classifier) and a slurry 434 comprising solvent, dissolved bitumen, dispersed asphaltenes and non-agglomerated inorganic material (overflow of the classifier). The classifier overflow 434 from the classifier 430 is passed through a heat exchanger 440 to reduce the temperature of the stream, and subsequently centrifuged 450, optionally with addition of water 442, separating the slurry into bitumen liquor 452 substantially free of asphaltenes and inorganic material and a bottom phase 454, comprising solvent, asphaltenes and non-agglomerated inorganic material. The bottom phase 454 can then be passed through a heat exchanger 460 to thereby increase the temperature of the phase in order to dissolve the asphaltene. The heated stream 454 may then be optionally flashed 470 to remove residual hexane, and redissolved 480 in an aromatic solvent 482, capable of dissolving the asphaltenes. The ensuing solution 484 is then further separated by a centrifuge 490, resulting in separation of fines 492 from asphaltenes 494.

EXAMPLE 7

Experimental work was conducted in order to study the solubility of asphaltenes during bitumen extraction in accordance with the present invention, and the association of fines with the asphaltenes.

The experimental conditions were as follows:

Three oil-sand samples taken from the same oil-sand field were dissolved each in a different solvent: toluene, hexane and naphtha (solvent:oil sand ratio=2:1 w/w). The liquor was decanted and subsequently centrifuged to separate fines. The asphaltenes in the toluene/bitumen liquor were almost completely soluble, with precipitation of fines and no noticeable precipitation of asphaltenes subsequent to centrifugation. In the hexane and naphtha liquors, however, following centrifugation, large quantities of precipitated asphaltenes (sediment asphaltenes) were noted, the large amounts being associated with their insolubility in these aliphatic solvents.

Following centrifugation, the solvent was evaporated from the liquor by a rotary evaporator and hexane was added to each sample, in excess (hexane:liquor=50:1 v/v), in order to precipitate the asphaltenes using centrifuge. Large quantities of asphaltenes precipitated from the toluene liquor, and minute quantities of asphaltenes precipitated from the hexane and naphtha liquors.

The measured fines content of the asphaltenes is 12 to 20%. This high solid content is explained by intimate association of clay minerals with the asphaltenes. Therefore, the usage of hexane as a solvent allows the improved separation of fines fraction that are highly associated with asphaltenes.

The invention claimed is:

1. A process for the separation of inorganic material from unconditioned oil sands, the process comprising:
 (a) providing a light aliphatic solvent selected from the group consisting of pentane, hexane, iso-hexane, neo-hexane, heptane and mixtures thereof, the light aliphatic solvent being capable of dissolving bitumen and dispersing asphaltenes present in the oil of unconditioned oil sands;
 (b) contacting unconditioned oil sands with the solvent under conditions permitting dispersion of the asphaltenes, the contacting being carried out utilizing a grinding medium, to thereby produce a mass;
 (c) transferring the mass obtained in step (b) into an agglomerator and adding at least one binding agent in an amount between 0.1 and 0.5 wt % of the mass, and agglomerating a significant portion of fines and coarse inorganic material from said mass and dissolving a significant portion of bitumen in the solvent,
 wherein the amount of solvent is adjusted to maintain dispersion of the asphaltenes, and
 wherein the amount of bitumen in the solvent-bitumen solution is adjusted to be less than 80%; and
 (d) separating the agglomerated inorganic material and non-agglomerated coarse inorganic material from said mass to obtain a slurry of organic material comprising dissolved bitumen, dispersed asphaltenes and non-agglomerated fines.

2. A process according to claim 1, wherein the unconditioned oil sands are selected from unconditioned oil-wet or unconditioned water-wet sands.

3. A process according to claim 1, wherein the at least one light aliphatic solvent is selected amongst such having a boiling point lower than about 100° C.

4. A process according to claim 1, wherein the slurry of step (d) is first classified by a classifier, followed by clarifier, and optionally followed by centrifugal separation means.

5. A process according to claim 4, wherein said centrifugal separation means is selected from a centrifuge and a hydrocyclone.

6. A process according to claim 1, wherein the at least one binding agent is selected from the group consisting of water, an aqueous media, lime gypsum slurry, a flocculant and mixtures thereof, wherein the at least one binding agent is added in an amount between 0.1% wt and 0.5% wt of the mass.

7. A process according to claim 1, further comprising:
(e) separating fines from the slurry obtained in step (d), under conditions permitting at least partial dissolution of the asphaltenes;
(f) treating the organic material under conditions permitting at least partial re-dispersion of the asphaltenes contained in said organic material; and
(g) separating the asphaltenes from the organic material to obtain a substantially asphaltene-free and fines-free bitumen liquor.

8. A process according to claim 7, wherein step (e) is carried out under one or both of temperature and pressure to dissolve at least part of the asphaltenes.

9. A process according to claim 7, wherein water is introduced to the slurry of step (e) or the bitumen liquor of step (g) prior to separation by the centrifugal based means.

10. A process according to claim 7, wherein the re-dispersion of step (f) is carried out by reducing one or both of temperature and pressure.

11. A process according to claim 7, wherein the re-dispersion of step (f) is carried out by association seeds selected from the group consisting of a particulate hydrophobic inorganic material, a polymeric additive, a high molecular weight organic additive and an asphaltenes particulate material.

12. A process according to claim 1, further comprising treating the slurry of step (d) under conditions permitting separation of the bitumen liquor from the asphaltenes and fines associated therewith, and subsequently treating the asphaltenes and fines associated therewith to selectively separate the fines from the asphaltenes.

13. A process according to claim 12, wherein prior to the selective separation, the asphaltenes and fines are treated by one or both of temperature and pressure to dissolve at least part of the asphaltenes.

14. A process according to claim 12, wherein the selective separation is carried out under one or both of temperature and pressure to dissolve at least part of the asphaltenes.

15. A process according to claim 12, wherein the separation of the bitumen liquor from the asphaltenes and the fines associated therewith or the selective separation of the fines from the asphaltenes is carried out in a centrifugal-based means selected from the group consisting of a centrifuge, a hydrocyclone, and any combination thereof.

16. A process according to claim 12, wherein in the selective separation, the asphaltenes and fines associated therewith are treated with at least one solvent capable of dissolving at least a portion of the asphaltenes.

17. A process according to claim 16, wherein the at least one solvent is selected from the group consisting of hexanes, benzene, toluene, xylenes, naphtha, chloroform, trichloromethane, tetrachloromethane, trichloroethane, limonene and mixtures thereof.

18. A process according to claim 1, wherein said contacting and agglomeration steps are carried out in the same mechanical unit.

19. A process for the separation of inorganic material from unconditioned oil sands, the process comprising:
(a) contacting unconditioned oil sands with a solvent which does not dissolve all of the organic material present in the oil sands, to produce a mass, the contacting being carried out utilizing a grinding medium and the light aliphatic solvent being selected from the group consisting of pentane, hexane, iso-hexane, neo-hexane, heptane and mixtures thereof, wherein the contacting step is conducted under conditions permitting dispersion of asphaltenes present in the oil sands;
(b) transferring the mass obtained in step (a) into an agglomerator and adding at least one binding agent in an amount of between 0.1 and 0.5 weight % of the mass to allow agglomeration of a significant portion of fines and coarse inorganic material in said mass and dissolving a significant portion of bitumen present in the oil sand into the solvent,
wherein the amount of solvent is adjusted to maintain dispersion of the asphaltenes, and
wherein the amount of bitumen in the solvent-bitumen solution is adjusted to be less than 80%;
(c) separating the agglomerated inorganic material and non-agglomerated coarse inorganic material from said mass to obtain a slurry of organic material comprising at least partially dissolved bitumen, at least partially dispersed asphaltenes and non-agglomerated fines;
(d) separating fines from the slurry obtained in step (c), under conditions permitting at least partial dissolution of the asphaltenes;
(e) treating the organic material under conditions permitting at least partial redispersion of the asphaltenes contained in said organic material; and
(f) separating the asphaltenes from the organic material to obtain a substantially asphaltene-free and fines-free bitumen liquor.

20. A process for the separation of inorganic material from unconditioned oil sands, the process comprising:
(a) providing a light aliphatic solvent, selected from the group consisting of pentane, hexane, iso-hexane, neo-hexane, heptane and mixtures thereof, the light aliphatic solvent being capable of dissolving bitumen and dispersing asphaltenes present in the oil unconditioned oil sands;
(b) contacting unconditioned oil sands with the solvent, the contacting being carried out utilizing a grinding medium, to thereby produce a mass, wherein the contacting step is conducted under conditions permitting dispersion of asphaltenes present in the oil sands;
(c) transferring the mass obtained in step (b) into an agglomerator and adding at least one binding agent in an amount of between 0.1 and 0.5 weight % of the mass, and agglomerating a significant portion of fines and coarse inorganic material from said mass to obtain agglomerates consisting of inorganic material and dissolving a significant portion of bitumen present in the oil sand into the solvent,
wherein the amount of solvent is adjusted to maintain dispersion of the asphaltenes, and
wherein the amount of bitumen in the solvent-bitumen solution is adjusted to be less than 80% ; and
(d) separating the agglomerates and non-agglomerated coarse inorganic material from said mass to obtain a slurry of organic material comprising at least partially dissolved bitumen, at least partially dispersed asphaltenes and non-agglomerated fines.

* * * * *